UNITED STATES PATENT OFFICE.

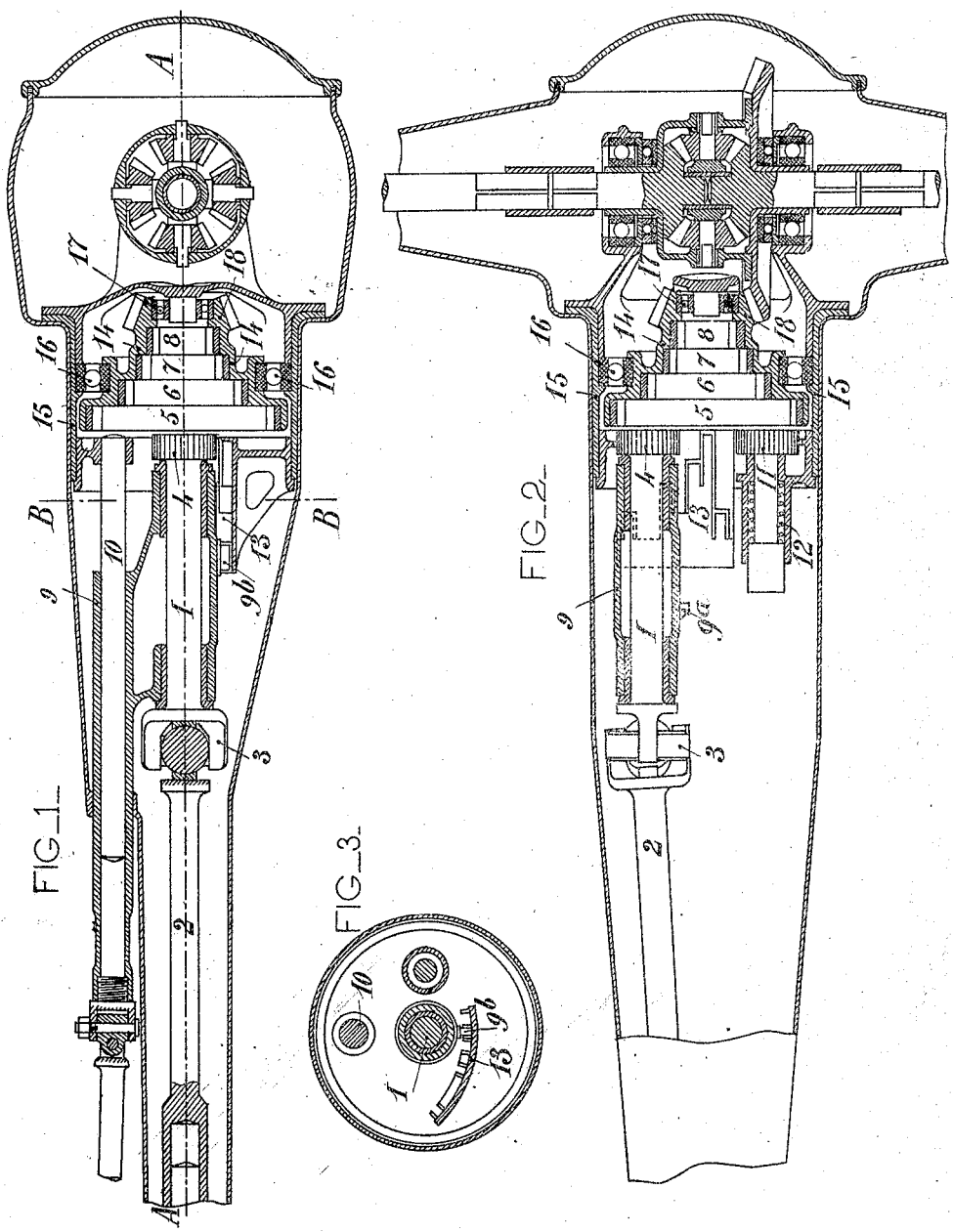

ANTOINE LAVOIX, OF PARIS, FRANCE, ASSIGNOR TO SOCIÉTÉ FRANÇAISE DE CONSTRUCTIONS MÉCANIQUES, (ANCIENS ETABLISSEMENTS CAIL,) OF DENAIN, FRANCE.

SPEED-CHANGING GEARING.

992,783.

Specification of Letters Patent. Patented May 23, 1911.

Application filed February 24, 1909. Serial No. 479,719.

*To all whom it may concern:*

Be it known that I, ANTOINE LAVOIX, a citizen of France, residing at 7 Rue de Châteaudun, Paris, in the Republic of France, have invented new and useful Improvements in Speed-Changing Gearing for Motor-Cars, of which the following is a specification.

This invention relates to speed changing gearing for motor cars and consists substantially in the use of a single shifting pinion which can be brought successively into engagement with any desired number of internally or externally toothed gears of different diameters, the smallest of which serves as a clutch in the case of internally toothed gears, the entire mechanism being mounted as a whole in an independent gear case or in a hollow casing attached to the back axle stay.

The accompanying drawings show by way of example one form of speed changing gearing according to this invention in which the shifting pinion is adapted to engage with internally toothed gears. Figure 1 being a vertical section, Fig. 2 a horizontal section thereof with the adjacent parts and Fig. 3 a cross section one line B B of Fig. 1.

1 and 2 are a line of shafting with a universal coupling 3, for receiving the power of the motor. The shaft 1 is carried in a bracket 9, adapted to oscillate and slide on a shaft 10. The shaft 1 carries at its end a pinion 4, which by suitable operation of the bracket 9 can be brought into direct engagement either with externally or internally toothed speed reducing gears 5, 6, 7 and 8, for forward travel, or into engagement with the gear 11 for rearward travel. During the forward travel the gear 8 acts as a toothed coupling when in engagement with the pinion 4 and the gear 11 is drawn back by a spring 12 or any other suitable means. For rearward travel, the gear 11 is carried along by a catch-tappet 9ª formed on the bracket 9 and comes into engagement with the gear 5 and reverses the direction of rotation. In each position of engagement the bracket 9 is locked in a sector 13 by means of a bolt 9ᵇ made solid with the bracket 9.

The gears 5, 6, 7, 8 which may vary in number, are fixed in a stepped box 14, mounted in a gear case 15 on ball bearings 16 and 17. The end of the box 14 may drive a shaft operating the driving axle, or it may carry directly a conical pinion 18 for operating the differential as shown in the accompanying drawings, in the case of internally toothed gear wheels.

The improved speed changing gear has the following important advantages: Increased efficiency in transmitting of the power of the motor is obtained by dispensing with intermediate gears. There is almost an entire absence of wear, as the gears work together with a very large number of teeth in the case of internally toothed gears. The mechanism is simpler and greater facility is afforded for dismounting the parts. Any desired number of speed reducing gears according to the purposes for which the vehicle is designed, may be employed without other complication.

Having now described my invention what I claim as new and desire to secure by Letters Patent is:

1. A speed changing gearing for motor cars comprising in combination a line of shafting with universal coupling adapted to receive the power of the motor and an oscillation and lengthwise movement, a pinion mounted at the free end of said line of shafting, a bracket carrying said shafting, a shaft on which said bracket is capable of oscillating and sliding, a stepped box provided with internally toothed gear wheels with which the pinion is adapted to be brought into direct engagement, a conical pinion mounted on said stepped box, a driven axle and a bevel gear wheel mounted on said axle and gearing with the conical pinion, substantially as described and for the purpose set forth.

2. A speed changing gearing for motor cars comprising in combination a line of shafting with universal coupling adapted to receive the power of the motor and an oscillation and lengthwise movement, a pinion mounted at the free end of said line of shafting, a bracket carrying said shafting, a shaft on which said bracket is capable of oscillating and sliding, a stepped box provided with internally toothed gear wheels with which the pinion is adapted to be brought into direct engagement, the smallest gear wheel forming with said pinion a toothed coupling, a conical pinion mounted on said stepped box, a driven axle, and a bevel gear wheel mounted on said axle and gearing with the conical pinion, substantially as described and for the purpose set forth.

3. A speed changing gearing for motor cars comprising in combination a line of shafting with universal coupling adapted to receive the power of the motor and an oscillation and lengthwise movement, a pinion mounted at the free end of said line of shafting, a bracket carrying said shafting, a shaft on which said bracket is capable of oscillating and sliding, a stepped box provided with a speed reducing gear wheel with which the pinion is adapted to be brought into direct engagement, an intermediary pinion adapted to be brought into engagement with the first pinion and one of the speed reducing gears, a conical pinion mounted on said stepped box, a driven axle, and a bevel gear wheel mounted on said axle and gearing with the conical pinion, substantially as described and for the purpose set forth.

4. A speed changing gearing for motor cars comprising in combination a line of shafting with universal coupling adapted to receive the power of the motor and an oscillation and lengthwise movement, a pinion mounted at the free end of said line of shafting, a bracket carrying said shafting and provided with a catch tappet, a shaft on which said bracket is capable of oscillating and sliding, a stepped box provided with internally toothed gear wheels, with which the pinion is adapted to be brought into direct engagement, an intermediary pinion adapted to be brought into engagement with the first pinion and one of the toothed gear wheels by means of said catch tappet, a small shaft carrying said intermediary pinion, a housing on which said small shaft is slidably mounted and which is secured to the gear case, a spring acting on said small shaft and tending to bring the intermediary pinion out of engagement with the corresponding toothed gear wheel, a conical pinion mounted on the stepped box, a driven axle, and a bevel gear wheel mounted on said axle and gearing with the conical pinion, substantially as described and for the purpose set forth.

5. A speed changing gearing for motor cars comprising in combination a line of shafting with universal coupling adapted to receive the power of the motor and an oscillation and lengthwise movement, a pinion mounted at the free end of said line of shafting, a bracket carrying said shafting, a shaft on which said bracket is capable of oscillating and sliding, a stepped box provided with speed reducing gear wheels with which the pinion is adapted to be brought into direct engagement, a bolt made solid with the bracket, a sector in which said bolt is adapted to be locked, when the pinion is engaged with either of the speed reducing gears, a conical pinion mounted on the stepped box, a driven axle, and a bevel gear wheel mounted on said axle and gearing with the conical pinion, substantially as described and for the purpose set forth.

In testimony whereof I have signed my name to this specification in the presence of two subscribing witnesses.

ANTOINE LAVOIX.

Witnesses:
 ALEXANDER TOSI,
 ELLWOOD AUSTIN WELDEN.